(12) United States Patent
Li et al.

(10) Patent No.: US 12,098,469 B2
(45) Date of Patent: Sep. 24, 2024

(54) COMPOSITIONS INCLUDING IONIC LIQUIDS AND METHODS OF MAKING THE SAME

(71) Applicants: Alliance for Sustainable Energy, LLC, Golden, CO (US); Drexel University, Philadelphia, PA (US)

(72) Inventors: Yawei Li, Shanxi (CN); Kenneth Charles Neyerlin, Arvada, CO (US); Joshua David Snyder, Sparks, MD (US)

(73) Assignees: Alliance for Sustainable Energy, LLC, Golden, CO (US); Drexel University, Philadelphia, PA (US)

( * ) Notice: Subject to any disclaimer, the term of this patent is extended or adjusted under 35 U.S.C. 154(b) by 348 days.

(21) Appl. No.: 17/487,108

(22) Filed: Sep. 28, 2021

(65) Prior Publication Data
US 2022/0098741 A1 Mar. 31, 2022

Related U.S. Application Data

(60) Provisional application No. 63/085,526, filed on Sep. 30, 2020.

(51) Int. Cl.
*H01M 4/86* (2006.01)
*C25B 11/053* (2021.01)
*H01M 4/88* (2006.01)
*H01M 8/10* (2016.01)

(52) U.S. Cl.
CPC ............. *C25B 11/053* (2021.01); *H01M 4/86* (2013.01); *H01M 4/88* (2013.01); *H01M 8/10* (2013.01)

(58) Field of Classification Search
CPC ............. H01M 4/86; H01M 4/88; H01M 8/10
See application file for complete search history.

(56) References Cited

U.S. PATENT DOCUMENTS

| | | | | |
|---|---|---|---|---|
| 5,561,000 | A * | 10/1996 | Dirven | H01M 8/1004 204/291 |
| 2013/0130133 | A1 * | 5/2013 | Jiang | H01M 8/0289 977/734 |
| 2014/0113218 | A1 | 4/2014 | Erlebacher et al. | |
| 2020/0014034 | A1 | 1/2020 | Huang et al. | |

OTHER PUBLICATIONS

Asadi, M. et al., "Robust carbon dioxide reduction on molybdenum disulphide edges," Nature Communications, Jul. 30, 2014, 8 pages.
Asadi, M. et al., "Nanostructured transition metal dichalcogenide electrocatalysts for CO2 reduction in ionic liquid," Science Reports, Jul. 2016, vol. 353, Issue 6296, 5 pages.

(Continued)

*Primary Examiner* — Caixia Lu
(74) *Attorney, Agent, or Firm* — Michael A. McIntyre

(57) ABSTRACT

The present disclosure relates to a composition that includes a solid, a first layer of an ionic liquid including an anion and a cation, a second layer including an ionically conductive ionomer, and a catalyst including a metal positioned on the solid, where the ionic liquid forms a first layer on the solid, the first layer is positioned between the second layer and the solid, and the catalyst is positioned between the solid and the first layer.

9 Claims, 8 Drawing Sheets

(56) References Cited

OTHER PUBLICATIONS

Atifi, A. et al., "Directing the Outcome of CO2 Reduction at Bismuth Cathodes Using Varied Ionic Liquid Promoters," ACS Catalysis, vol. 8, 2018, 7 pages.
Benn, E. et al., "Characterization of Nanoporous Metal-Ionic Liquid Composited for the Electrochemical Oxygen Reduction Reaction," Journal of the Electrochemical Society, vol. 162, No. 10, 2015, 8 pages.
Burdyny, T. et al., "CO2 reduction on gas-diffusion electrodes and why catalytic performance must be assessed at commercially-relevant conditions," Energy & Environmental Science, vol. 12, 2019, 12 pages.
Chen, L. et al., "Electrochemical Reduction of CO2 at Metal Electrodes in a Distillable Ionic Lliquid," ChemSusChem, vol. 9, 2016, 8 pages.
Chen, Y. et al., "A Robust, Scalable Platform for the Electrochemical Conversion of CO2 to Formate: Identifying Pathways to Higher Energy Efficiencies," ACS Energy Letters, vol. 5, 2020, 9 pages.
Choi, J. et al., "High Performance Fe Porphyrin/Ionic Liquid Co-catalyst for Electrochemical C2 Reduction," ChemPubSoc Europe, vol. 22, 2016, 4 pages.
Chu, D. et al., "Fixation of CO2 by Electrocatalytic Reduction and Electropolymerization in Ionic Liquid-H2O Solution," ChemSusChem, vol. 1, 2008, 5 pages.
Dimeglio, J.L. et al., "Selective Conversion of CO2 to CO with High Efficiency Using an Inexpensive Bismuth-Based Electrocatalyst," Journal of the American Chemical Society, vol. 135, 2013, 4 pages.
Feng, Q. et al., "Nanoporous copper incorporated platinum composites for electrocatalytic reduction of CO2 in ionic liquid BMIMBF4," Applied Surface Science, vol. 258, 2012, 5 pages.
Gabardo, C. et al., "Combined high alkalinity and pressurization enable efficient CO2 electroreduction to CO," Energy & Environmental Science, vol. 11, 2018, 9 pages.
Garg, S. et al., "Advances and challenges in electrochemical CO2 reduction processes: an engineering and design perspective looking beyond new catalyst materials," Journal of Materials Chemistry A, vol. 8, 2020, 34 pages.
George, M. et al., "Effect of Ionic Liquid Modification on the ORR Performance and Degradation Mechanism of Trimetallic PtNiMo/C Catalysts," ACS Catalysis, vol. 9, 2019, 11 pages.
Goncalves, W.D.G. et al., "Efficient electrocatalytic CO2 reduction driven by ionic liquid buffer-like solutions," ChemSusChem 12.18, 2019, 7 pages.
Grills, D.C. et al., "Electrocatalytic CO2 Reduction with a Homogeneous Catalyst in Ionic Liquid: High Catalytic Activity at Low Overpotential," Journal of Physical Chemistry Letters, vol. 5, 2014, 6 pages.
Hanc-Scherer, F. et al., "Surface structured platinum electrodes for the electrochemical reduction of carbon dioxide in imidazolium based ionic liquids," PCCP, vol. 17, 2015, 8 pages.
Hollingsworth, N. et al., "Reduction of Carbon Dioxide to Formate at Low Overpotential Using a Superbase Ionic Liquid," Angewandte Chem., vol. 127, 2015, 5 pages.
Huang, K. et al., "Enhancing Pt/C Catalysts for the Oxygen Reduction Reaction with Protic Ionic Liquids: The Effect of Anion Structure," Journal of the Electrochemical Society, vol. 164, No. 13, 2017, 12 pages.
Iijima, G. et al., "CO2 Reduction Promoted by Imidazole Supported on a Phosphonium-Type Ionic-Liquid-Modified Au Electrode at a Low Overpotential," ACS Catalysis, vol. 8, 2018 11 pages.
Kaczur, J. et al., "Carbon Dioxide and Water Electrolysis Using New Alkaline Stable Anion Membranes," Frontiers in Chemistry, Technology Report, vol. 6, Jul. 2018, 16 pages.
Kim, B. et al., "Influence of dilute feed and pH on electrochemical reduction of CO2 to CO on Ag in a continuous flow electrolyzer," Electrochimica Acta, vol. 166, 2015, 6 pages.
Koh, J.H. et al., "Oxygen Plasma Induced Hierarchically Structured Gold Electrocatalyst for Selective Reduction of Carbon Dioxide to Carbon Monoxide," Journal of Physical Chemistry C, vol. 119, 2015, 7 pages.
Leonard, M.E. et al., "Investigating Electrode Flooding in a Flowing Electrolyte, Gas-Fed Carbon Dioxide Electrolyzer," ChemSusChem, vol. 13, 2020, 12 pages.
Li, F. et al., "Molecular tuning of CO2-to-ethylene conversion," Nature, vol. 577, 2020, 6 pages.
Lim, H.K. et al., "Insight into the Microenvironments of the Metal-Ionic Liquid Interface during Electrochemical CO2 Reduction," ACS Catalysis, vol. 8, 2018, 8 pages.
Liu, X. et al., "pH effects on the electrochemical reduction of CO(2) towards C2 products on stepped copper," Nature Communications, 2019, 10 pages.
Luo, H. et al., "Ultrastable Superbase-Derived Protic Ionic Liquids," The Journal of Physical Chemistry B Letters, vol. 113, 2009, 3 pages.
Papasizza, M. et al., "In Situ Monitoring Using ATR-SEIRAS of the Electrocatalytic Reduction of CO2 on Au in an Ionic Liquid/Water Mixture," ACS Catalysis, vol. 8, 2018, 8 pages.
Rey, N.G. et al., "Structural Transition in an Ionic Liquid Controls CO2 Electrochemical Reduction," Journal of Physical Chemistry C, vol. 119, 2015, 8 pages.
Rosen, B. et al., "Ionic Liquid-Mediated Selective Conversion of CO2 to CO at Low Overpotentials," Science, vol. 334, Nov. 4, 2011, 3 pages.
Rosen, B. et al., "In Situ Spectroscopic Examination of a Low Overpotential Pathway for Carbon Dioxide Conversion to Carbon Monoxide," Journal of Physical Chemistry C, vol. 116, 2012, 6 pages.
Rosen, B. et al., "Water Enhancement of CO2 Conversion on Silver in 1-Ethyl-3-Methylimidazolium Tetrafluoroborate," Journal of The Electrochemical Society, vol. 160, No. 2, 2013, 5 pages.
Roy, N. et al., "Ionic-Liquid-Assisted Selective and Controlled Electrochemical C2 Reduction at Cu-Modified Boron-Doped Diamond Electrode," ChemElectroChem Communications, vol. 3, 2016, 4 pages.
Salehi-Khojin, A. et al., "Nanoparticle Silver Catalysts That Show Enhanced Activity for Carbon Dioxide Electrolysis," Journal of Physical Chemistry C, vol. 117, 2013, 6 pages.
Shi, J. et al., "A novel electrolysis cell for CO2 reduction to CO in ionic liquid/organic solvent electrolyte," Journal of Power Sources, vol. 259, 2014, 4 pages.
Snuffin, L. et al., "Catalytic Electrochemical Reduction of CO2 in Ionic Liquid EMIMBF3C1," Journal of the Electrochemical Society, vol. 158, No. 9, 2011, 4 pages.
Snyder, J. et al., "Oxygen Reduction Reaction Performance of [MTBD[beti]-Encapsulated Nanoporous NiPt Alloy Nanoparticles," Advanced Functional Materials, vol. 23, 2013, 8 pages.
Stamenkovic, V. et al., "Improved Oxygen Reduction Activity on Pt3Ni(111) via Increased Surface Site Availability," Science, vol. 315, Jan. 26, 2007, 6 pages.
Sun, L. et al., "Switching the Reaction Course of Electrochemical CO2 Reduction with Ionic Liquids," Langmuir, vol. 30, 2014, 7 pages.
Sun, Y. et al., "Ultrasonic-electrodeposition of PtPd alloy nanoparticles on ionic liquid-functionalized graphene paper: towards a flexible and versatile nanohybrid electrode," RSC Nanoscale, vol. 8, 2016, 12 pages.
Tan, Y. et al., "A graphene-platinum nanoparticles-iionic liquid composite catalyst for methanol-tolerant oxygen reduction reaction," Energy & Environmental Science, vol. 5, 2012, 5 pages.
Van Cleve, T. et al., "Dictating Pt-Based Electrocatalyst Performance in Polymer Electrolyte Fuel Cells, from Formulation to Application," ACS Applied Materials & Interfaces, vol. 11, 2019, 12 pages.
Vasilyev, D. et al., "Pyrazolium Ionic Liquid Co-catalysts for the Electroreduction of CO2," Applied Energy Materials, vol. 1, 2018, 5 pages.
Vasilyev, D. et al., "Principal Descriptors of Ionic Liquid Co-catalysts for the Electrochemical Reduction of CO2," ACS Applied Energy Materials, vol. 3, 2020, 9 pages.

(56) References Cited

OTHER PUBLICATIONS

Wang, M. et al., "Ionic Liquid-Modified Microporous ZnCoNC-Based Electrocatalysts for Polymer Electrolyte Fuel Cells," ACS Energy Letters, vol. 4, 2019, 7 pages.
Xiao, F. et al., "Ultrasonic-electrodeposition of gold-platinum alloy nanoparticles on multi-walled carbon nanotubes—ionic liquid composite film and their electrocatalysis towards the oxidation of nitrite," Elsevier Electrochemistry Communications, vol. 10, 2008, 4 pages.
Yang, D-W et al., "Electrochemical Impedance Studies of CO2 Reduction in Ionic Liquid/Organic Solvent Electrolyte on Au Electrode," Electrochimica Acta, vol. 189, 2016, 6 pages.
Yunus, N.M. et al., "Solubility of CO2 in pyridinium based ionic liquids," Chemical Engineering Journal, 189-190, 2012, 7 pages.
Zhang, G-R. et al., "Accelerating Oxygen-Reduction Catalysts through Preventing Poisoning with Non-Reactive Species by Using Hydrophobic Ionic Liquids," Communications, Angewandte Chemie, International Edition, vol. 55, 2016, 5 pages.
Zhang, Z. et al., "Hydrogenation of CO2 to Formic Acid Promoted by a Diamine-Functionalized Ionic Liquid," ChemSusChem, vol. 2, 2009, 5 pages.
Zhu, Q. et al., "Efficient Reduction of CO2 into Formic Acid on a Lead or Tin Electrode using an Ionic Liquid Catholyte Mixture," Angewandte Chemie, vol. 128, 2016, 5 pages.
Li, Y. et al., "Sequential Capacitive Deposition of Ionic Liquids for Conformal Thin Film Coatings on Oxygen Reduction Reaction Electrocatalysts," ACS Catalysis, vol. 9, 2019, 6 pages.

* cited by examiner

COMPOSITIONS INCLUDING IONIC LIQUIDS AND METHODS OF MAKING THE SAME

CROSS-REFERENCE TO RELATED APPLICATIONS

This application claims priority from U.S. Provisional Patent Application No. 63/085,526 filed on Sep. 30, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

SUMMARY

An aspect of the present disclosure is a composition that includes a solid, a first layer of an ionic liquid including an anion and a cation, a second layer including an ionically conductive ionomer, and a catalyst including a metal positioned on the solid, where the ionic liquid forms a first layer on the solid, the first layer is positioned between the second layer and the solid, and the catalyst is positioned between the solid and the first layer. In some embodiments of the present disclosure, the metal may include at least one of a transition metal and/or a post-transition metal.

In some embodiments of the present disclosure, the solid may include a porous material. In some embodiments of the present disclosure, the catalyst may be positioned within a pore of the porous material. In some embodiments of the present disclosure, the solid may have an average particle size between about 10 nm and about 1 mm. In some embodiments of the present disclosure, the anion may include at least one of bis(perfluoroethylsulfonyl)imide (beti), (bis(trifluoromethylsulfonyl)imide) (Tf2N), tetrafluoroborate (BF4), and/or hexafluorophosphate (PF6). In some embodiments of the present disclosure, the cation may include at least one of an imidazolium-based cation, a pyridinium-based cation, a guanidinium-based cation, and/or a pyrazolium-based cation. In some embodiments of the present disclosure, the imidazolium-based cation may include at least one of 7-methyl-1,5,7-triazabicyclo[4.4.0]dec-5-ene (MTBD), 1-butyl-3-methyl-imidazolium (BMIM), and/or 1-ethyl-3-methylimidazolium (EMIM).

The present disclosure relates to a method that includes a first mixing of a solid with a first solution that includes a first solvent and a first salt of a first ionic additive, resulting in a forming of a first slurry that includes the solid and a depositing of a first ion onto the solid and a second mixing of the solid with a second solution that includes a second solvent and a second salt of a second ionic additive, resulting in a forming of a second slurry that includes the solid, a depositing of a second ion onto the solid, and a forming of an ionic liquid on the solid, where the first ion has a charge opposite the charge of the second ion and the ionic liquid includes the first ion and the second ion. In some embodiments of the present disclosure, the first mixing may be performed utilizing at least one of ultrasound and/or mechanical mixing.

In some embodiments of the present disclosure, the first mixing may be performed at a first temperature between about 0° C. and about 80° C. In some embodiments of the present disclosure, the first salt may be present in the first solution at a first concentration between about 0.001 mmol/L and the saturation point of the first salt in the first solution. In some embodiments of the present disclosure, the first salt may include at least one of Li[beti], Li[Tf2N], Na[BF4], Na[PF6], H[MTBD], [BMIM]Cl, and/or [EMIM]Cl, where the first salt provides the first ion. In some embodiments of the present disclosure, the second mixing may be performed utilizing at least one of ultrasound and/or mechanical mixing. In some embodiments of the present disclosure, the second mixing may be performed at a second temperature between about 0° C. and about 80° C. In some embodiments of the present disclosure, the second salt may be present in the second solution at a second concentration between about 0.001 mmol/L and the saturation point of the second salt in the second solution. In some embodiments of the present disclosure, the second salt may include at least one of Li[beti], Li[Tf2N], Na[BF4], Na[PF6], H[MTBD], [BMIM]Cl, or [EMIM]Cl, where the second salt provides the second ion. In some embodiments of the present disclosure, first solvent may include at least one of water, isopropyl alcohol, n-propanol alcohol (NPA), dimethylformamide, hexane, and/or acetonitrile. In some embodiments of the present disclosure, the method may further include, after the first mixing, a first separating of the solid from the first slurry, resulting in the solid being substantially free of the first solvent.

BACKGROUND

High-surface-area porous carbon (HSC) is a preferred support for electrocatalysts due to its large available surface for metal deposition and low cost. However, if metal (e.g., platinum) is impregnated into the inner pores of the HSC, the proton and oxygen transport resistances become large, especially at low relative humidity (RH) due to insufficient ionomer wetting, leading to poor high current density (HCD) performance. Thus, there remains a need for improved electrocatalysts and methods of the making electrocatalysts.

BRIEF DESCRIPTION OF DRAWINGS

Some embodiments are illustrated in referenced figures of the drawings. It is intended that the embodiments and figures disclosed herein are to be considered illustrative rather than limiting.

Figure 1:
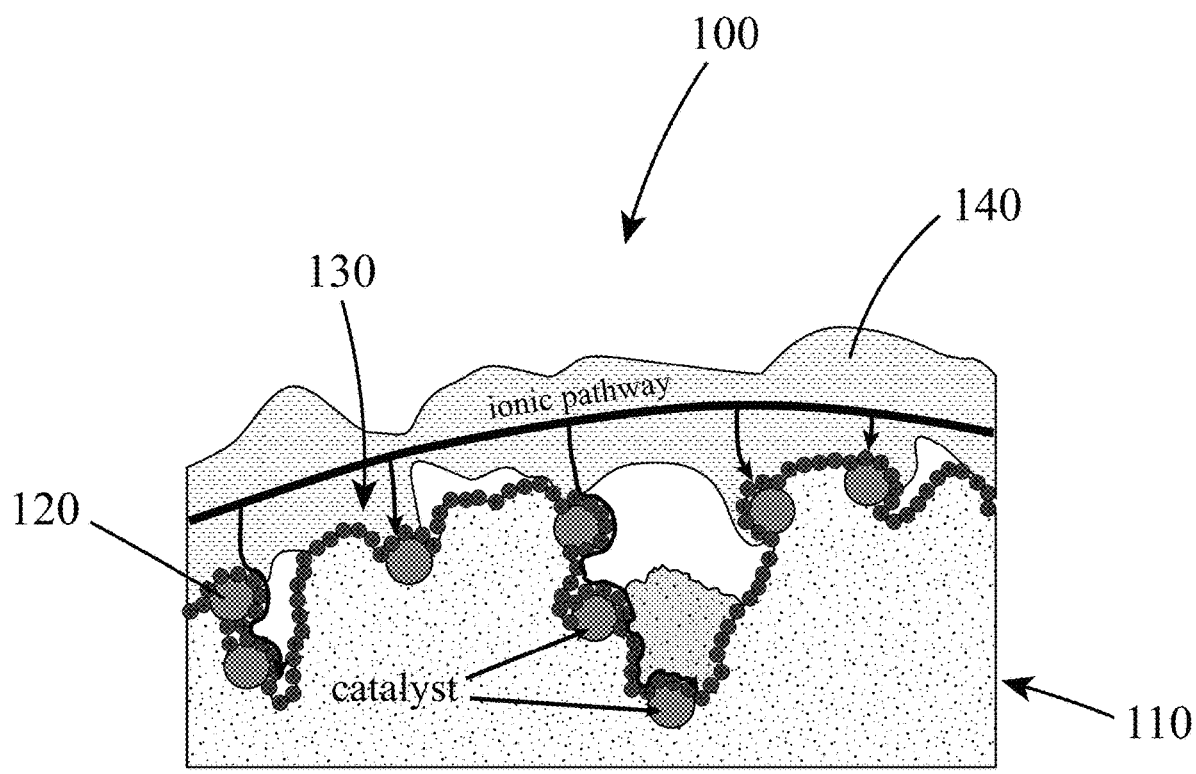
FIG. 1 illustrates a composition, according to some embodiments of the present disclosure.

| REFERENCE NUMERALS | |
| --- | --- |
| 100 | composition |
| 110 | solid |
| 120 | catalyst |
| 122 | first ionic additive |
| 124 | second ionic additive |
| 130 | ionic liquid |
| 140 | ionomer |
| 200 | method |
| 210 | first mixing |
| 212 | first solution |
| 215 | first slurry |
| 220 | first separating |
| 225 | first solid |
| 230 | second mixing |
| 232 | second solution |
| 235 | second slurry |
| 240 | second separating |
| 245 | second solid |
| 250 | contacting |
| 255 | third solid |
| 260 | product |

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to, among other things, methods for synthesizing composite structures, including sequential deposition methods that deposit ionic liquids onto the surface of a solid. In some embodiments of the present disclosure, a method may deposit a hydrophobic protic ionic liquid, having a high-oxygen solubility, onto the surface of a solid material, e.g., an electrocatalyst. For example, as shown herein, a sequential deposition method may include a first depositing of either the anion or the cation of a targeted ionic liquid onto a solid by mixing the solid with a first salt solution containing either the anion or the cation of the targeted ionic liquid. The method may then continue with a second depositing of the remaining ion (either the cation or the anion) of the targeted ionic liquid onto the solid by mixing the solid, in a second step, with a second salt solution containing the remaining ion of the targeted ionic liquid. As shown herein, such a sequential deposition method has resulted in electrodes containing the resultant catalysts that demonstrate enhanced mass transport performance and significantly improved catalyst (e.g., platinum) utilization at low relative humidity (RH), especially for catalysts supported on high surface area carbons (HSC). These results suggest, among other things, that the sequential deposition methods described herein can successfully deposit an ionic liquid within the pores of a HSC where, among other things, the ionic liquid may perform as a bridge to yield high protonic conductivity and oxygen transport. Thus, the methods described herein provide a promising strategy to enhance device-level performance of fuel cells, $CO_2$ reduction, and/or other electrochemical conversion devices.

FIG. 1 illustrates a composition 100, according to some embodiments of the present disclosure. This exemplary composition 100 includes a solid 110 having an external surface and pores, where a substantial portion of the external surface and at least some of the pores are covered with a first layer of an ionic liquid 120. The ionic liquid 120 is constructed from a first ionic additive that provides a first ion (e.g., a cation or anion) and a second ionic additive that provides a second ion (e.g., cation or anion) having the opposite charge of the first ion. In some embodiments of the present disclosure, the composition 100 may further include a second layer of an ionically conductive ionomer 140, where the first layer may be positioned between the second layer 120 and the solid 110. As shown in Figure, a composition 100 may also include a catalyst 120 positioned on the solid 110, where the catalyst is positioned between the solid 110 and the first layer of ionic liquid 130.

In some embodiments of the present disclosure, a catalyst 120 may include a metal, of at least one of a transition metal and/or a post-transition metal. Examples of a transition metal include platinum, palladium, gold, silver, nickel, cobalt, and/or copper iridium. Examples of a post-transition metal include bismuth, lead, and/or tin. In some embodiments of the present disclosure, a solid 110 may include a porous material. For the case where the solid 110 is porous, a catalyst 120 may be positioned within a pore of the solid 110. A porous solid 110 may include at least one of a carbon and/or a metal oxide, with examples of metal oxides including alumina, silica, and/or titania. In some embodiments of the present disclosure, a solid 110 made of carbon may include at least one of a Ketjen carbon and/or a furnace black. An example of a furnace black includes an oxidized acetylene black. In some embodiments of the present disclosure, a solid 110 may have an average particle size between about 10 nm and about 1 mm. In some embodiments of the present disclosure, a solid 110 may have a surface area between about 50 $m^2/g$ and about 2,000 $m^2/g$. In some embodiments of the present disclosure, a solid 110 may have a porosity between about 0.001 ml/g and about 1.0 ml/g.

In some embodiments of the present disclosure, a first ionic additive of an ionic liquid 120 may provide an anion that includes at least one of bis(perfluoroethylsulfonyl)imide (beti), (bis(trifluoromethylsulfonyl)imide) (Tf2N), tetrafluoroborate (BF4), and/or hexafluorophosphate (PF6). In some embodiments of the present disclosure, a second ionic additive of an ionic liquid 120 a cation may include at least one of an imidazolium-based cation, a pyridinium-based cation, a guanidinium-based cation, and/or a pyrazolium-based cation. Examples of an imidazolium-based cation includes at least one of 7-methyl-1,5,7-triazabicyclo[4.4.0]dec-5-ene (MTBD), 1-butyl-3-methyl-imidazolium (BMIM), and/or 1-ethyl-3-methylimidazolium (EMIM). A composition 100 as described herein may provide at least one physical property and/or performance metric favorable for the oxygen reduction reaction. Examples of favorable physical properties and/or performance metrics include at least one proton conductivity, oxygen solubility, viscosity, hydrophobicity, $CO_2$ solubility, CO solubility, and/or thermal stability.

Figure 2:
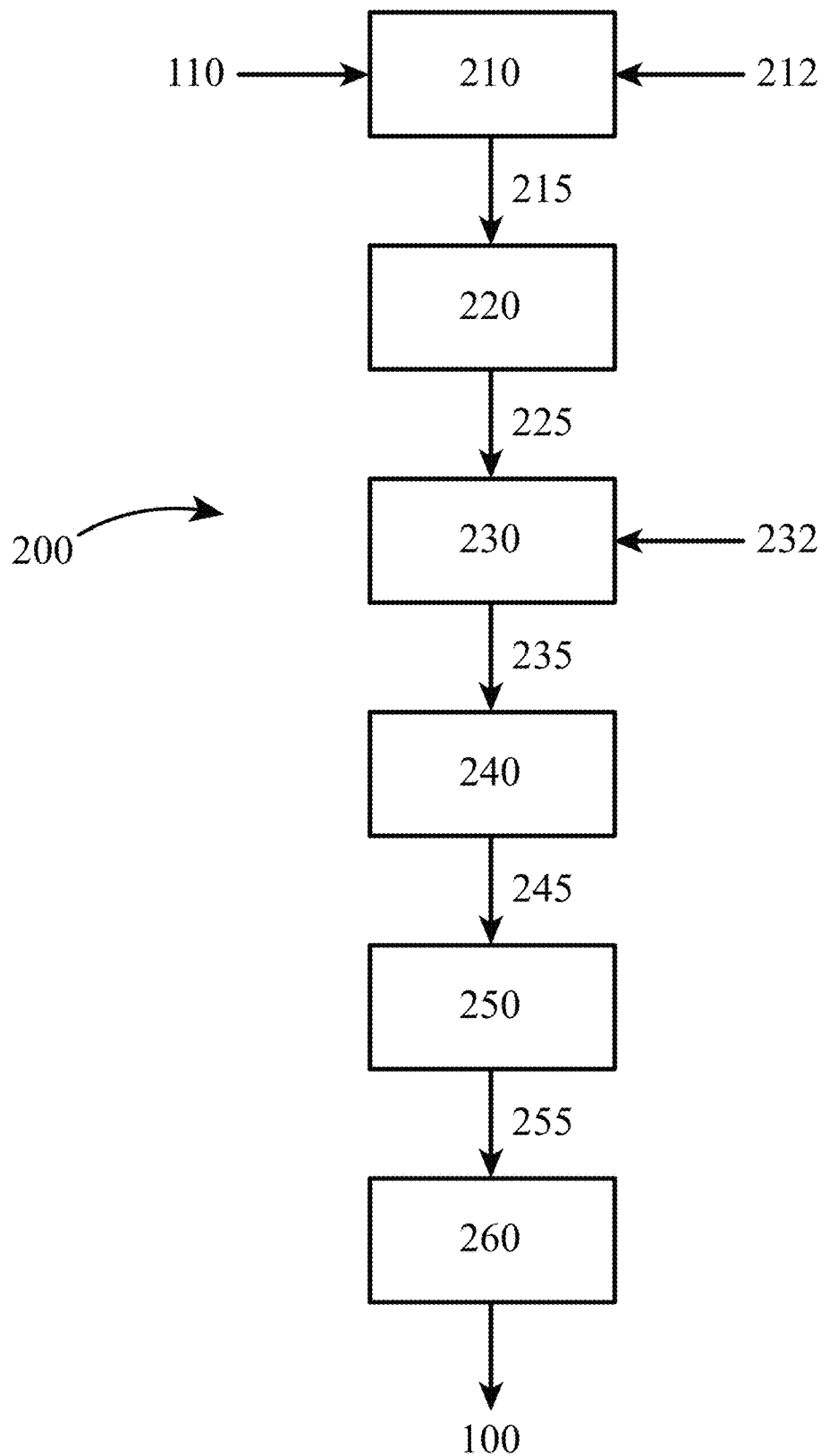
FIG. 2 illustrates a method for making a composition like that illustrated in FIG. 1, according to some embodiments of the present disclosure.

FIG. 2 illustrates a method 200 for making a composition 100 like that illustrated in FIG. 1, according to some embodiments of the present disclosure. This exemplary method 200 begins with a first mixing 210 of a solid 110 with a first solution 212 of a first solvent and a first salt of a first ionic additive. In some embodiments of the present disclosure, the first mixing 210, may result in a forming of a first slurry 215 of the solid 110, as well as the depositing of a first ion of an ionic liquid 130 onto the solid 110. As described herein, the method 200 may continue with a second mixing 230 of the solid 110 with a second solution 232 of a second solvent and a second salt of a second ionic additive, resulting in a forming of a second slurry 235 made up of the solid 110. The second mixing 230 may also result in the depositing of a second ion of the ionic liquid 130 onto the solid 110, resulting in the forming of a layer of the ionic liquid 130 on the solid 110. To form the coating of ionic liquid 130, the first ion has a charge opposite the charge of the second ion.

In some embodiments of the present disclosure, the first mixing 210 may be performed utilizing at least one of ultrasound and/or mechanical mixing. The first mixing 210 may be performed at a first temperature between about 0° C. and about 80° C. or between about 0° C. and about 30° C. In some embodiments of the present disclosure, the first salt may be present in the first solution 212 at a first concentration between about 0.001 mmol/L and close to the saturation point of the salt in the first solution 212 or between about 0.001 mol/L and about 1 mol/L. In some embodiments of the present disclosure, the first salt may include at least one of Li[beti], Li[Tf2N], Na[BF4], Na[PF6], H[MTBD], [BMIM]Cl, and/or [EMIM]Cl, thereby providing the first ion used to synthesize the ionic liquid 130. Mixing 210 may be achieved using any suitable mixing device and/or unit operation with examples including a stirred-tank reactor (STR), a continuous stirred-tank reactor (CSTR), and/or a sonicator, as long as the device and/or unit operation provides complete and/or near complete mixing.

In some embodiments of the present disclosure, the second mixing 230 may be performed utilizing at least one of ultrasound and/or mechanical mixing. The second mixing 230 may be performed at a second temperature between about 0° C. and about 80° C. or between about 0° C. and about 30° C. In some embodiments of the present disclosure, the second salt may be present in the second solution 232 at a second concentration between about 0.001 mmol/L and close to the saturation point of the salt in the first solution 212 or between about 0.001 mol/L and about 1 mol/L. In some embodiments of the present disclosure, the second salt may include at least one of Li[beti], Li[Tf2N], Na[BF4], Na[PF6], H[MTBD], [BMIM]Cl, or [EMIM]Cl, thereby providing the second ion used to synthesize the ionic liquid 130.

In some embodiments of the present disclosure, the first solvent used to make the first solution 212 may include at least one of water, isopropyl alcohol, n-propanol alcohol (NPA), dimethylformamide, hexane, and/or acetonitrile. In some embodiments of the present disclosure, a method 200 may further include, after the first mixing 210, a first separating 220 of the solid 110 from the first slurry 215, resulting in a first solid 225 that is substantially free of the first solvent. A first separating 220 may be performed by at least one of filtration, centrifugation, and/or evaporation. In some embodiments of the present disclosure, the second solvent used to make the second solution 232 may include at least one of water, isopropyl alcohol, NPA, dimethylformamide, hexane, and/or acetonitrile. In some embodiments of the present disclosure, a method 200 may further include, after the second mixing 230, a second separating 240 of the solid 110 from the second slurry 235, resulting in a second solid 245 that is substantially free of the second solvent. A second separating 240 may be performed by at least one of filtration, centrifugation, and/or evaporation.

In some embodiments of the present disclosure, a method 200 may further include, after the second separating 240, a contacting 250 of the second solid 245 with a liquid (not shown), where the contacting 250 removes an impurity from the second solid 245 to produce a third solid 255 that is substantially free of impurities. In some embodiments of the present disclosure, the liquid used in the contacting 250 may include water; e.g., purified water, distilled water, deionized water, etc. In some embodiments of the present disclosure, a method 200 may further include, after the contacting 250, a drying 250 of the third solid 250, resulting in the final targeted composition 100 illustrated in FIG. 1. In some embodiments of the present disclosure, the drying 260 may be performed at a pressure less than atmospheric pressure. In some embodiments of the present disclosure, the drying 260 may be performed at a temperature between about 25° C. and about 400° C., or between about 25° C. and about 100° C.

Figure 3A:
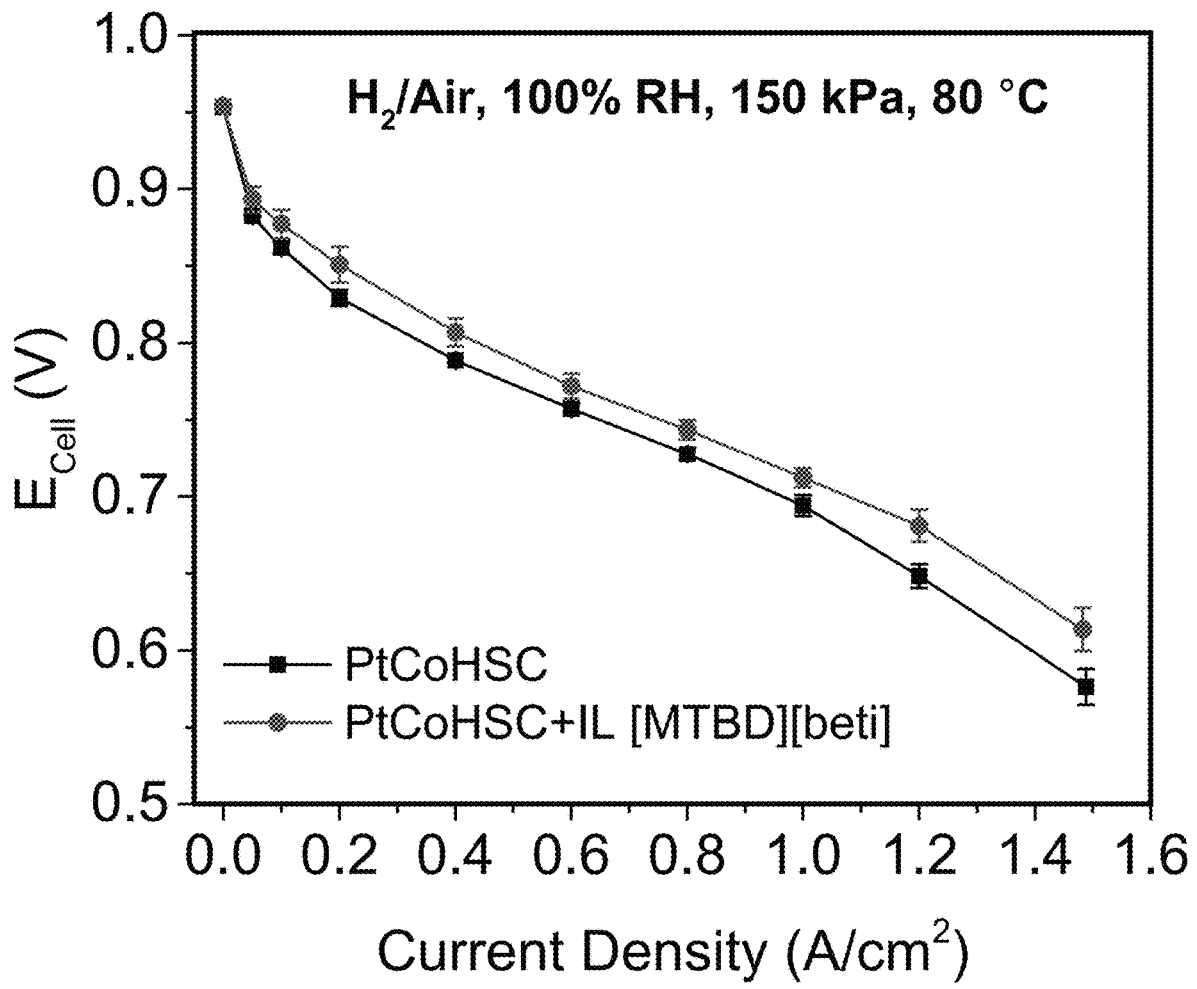
FIGS. 3A and 3B illustrate a comparison of two compositions, one with an ionic liquid layer and one without an ionic liquid layer, according to some embodiments of the present disclosure.
Figure 3B:
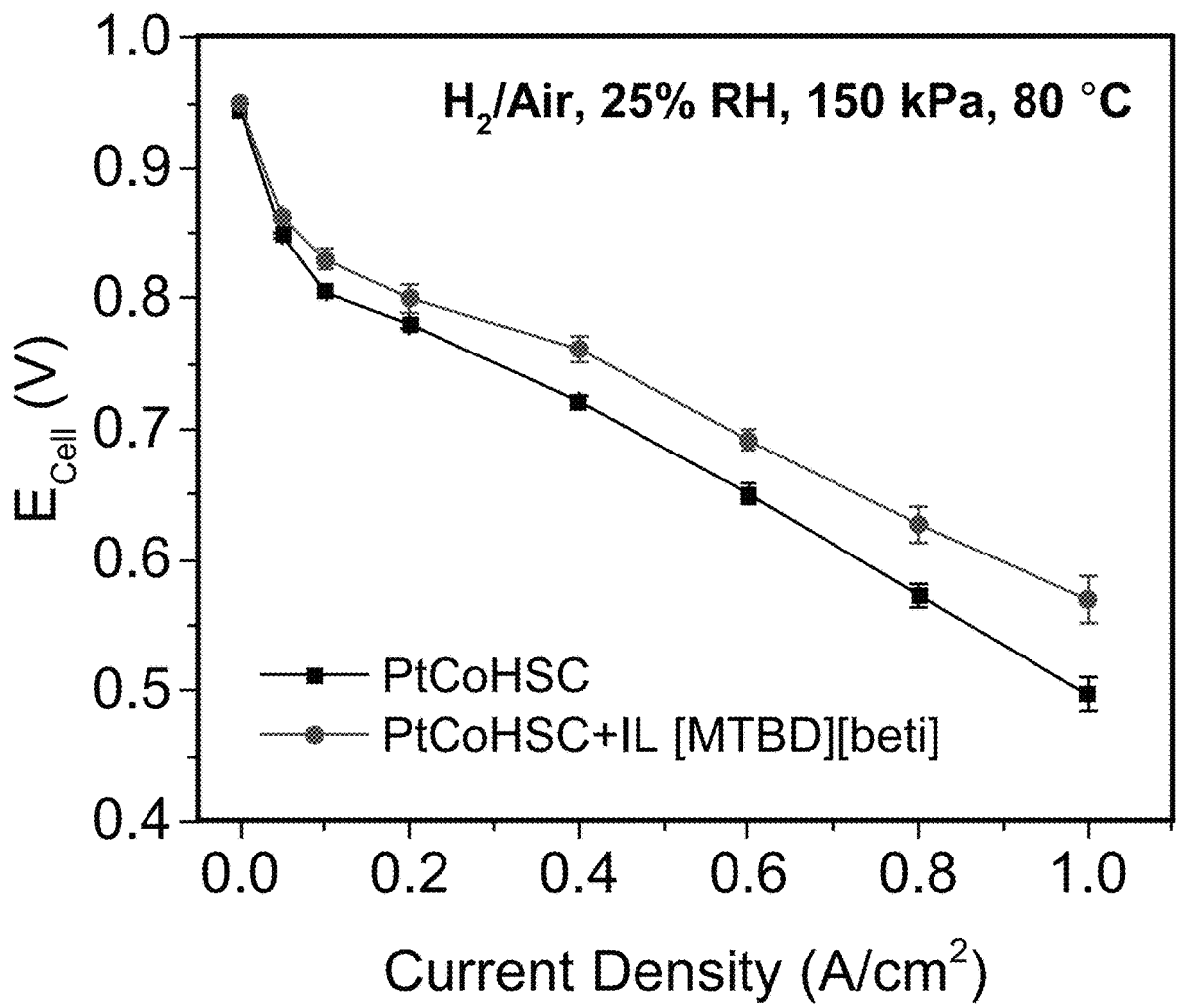

Experimental Results:

FIGS. 3A and 3B illustrate a comparison of cell voltage potentials, $E_{cell}$ (v), of two compositions, one with an ionic liquid layer of [MTBD][beti], and one without an ionic liquid layer, according to some embodiments of the present disclosure. Specifically FIGS. 3A and 3B illustrate average $H_2$/air performance, where "$H_2$/air performance" refers to fuel cell performance by purging $H_2$ at the anode and air at the cathode. The principal reaction here is oxygen reduction, and result is closer to a fuel cell operating in a real environment. The data are for a composition of PtCo catalyst positioned on a high-surface-area porous carbon catalyst (PtCoHSC) at 80° C., 150 kPa and 100% a relative humidity (RH) (FIG. 3A) and 25% RH (FIG. 3B). The high-current-density (HCD) performance is usually limited by the transport of reactants, protons and oxygen. Here the improved HCD performance with the ionic liquid (IL) indicates that the incorporation of the IL into the carbon pores significantly improves proton and oxygen transport within the mesopore, even at dry conditions.

Figure 4:
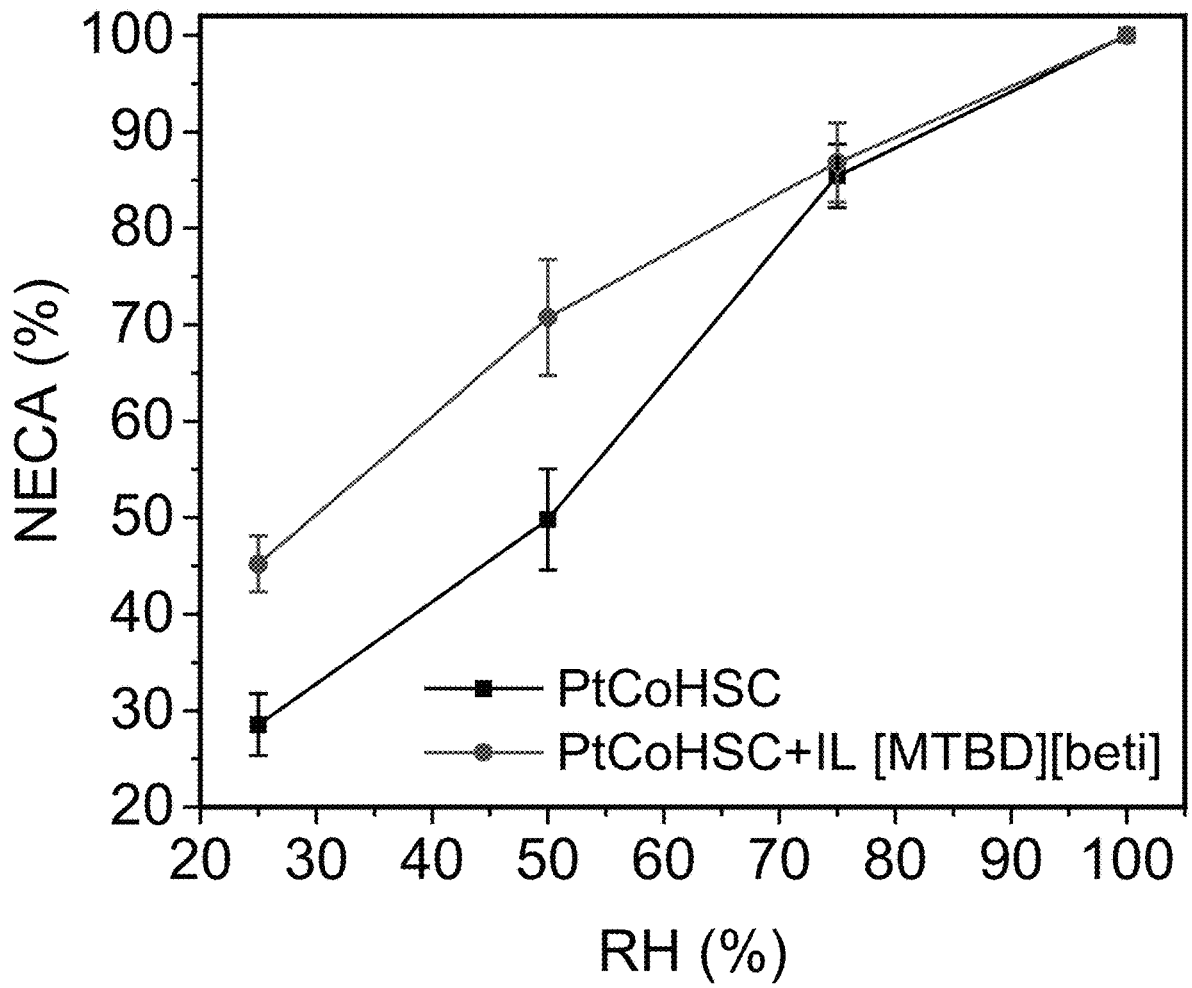
FIG. 4 illustrates a comparison of normalized electrochemical active surface area (NECA) of two compositions, one with an ionic liquid layer and one without an ionic liquid layer, according to some embodiments of the present disclosure.
Figure 5:
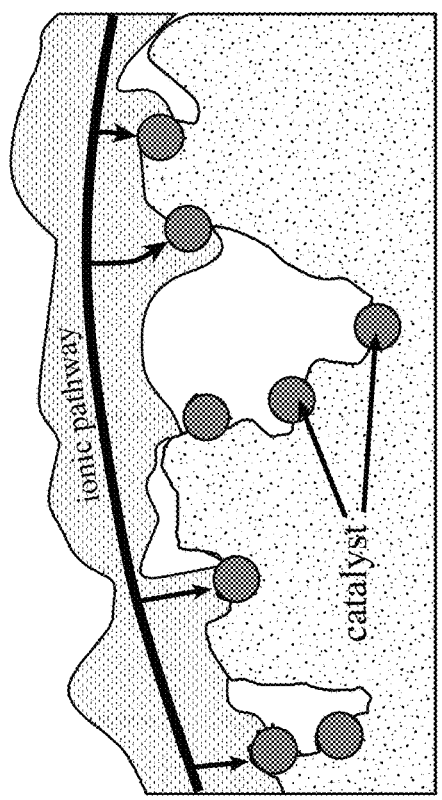
FIG. 5 illustrates a schematic showing how an ionic liquid may act as a protonic bridge to aid protonic transport in a composition, according to some embodiments of the present disclosure.
Figure 5:
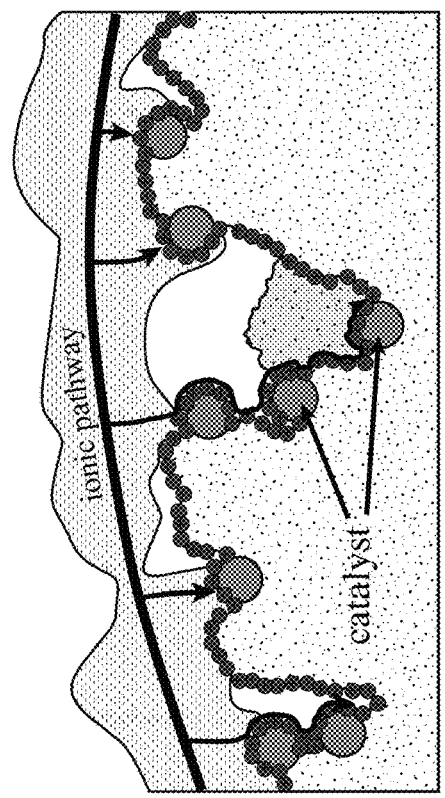

FIG. 4 illustrates normalized electrochemical active surface area (NECA) of PtCoHSC membrane electrode assemblies (MEAs) (0.10 $mg_{Pt}/cm^2$) as function of RH at 80° C., for two compositions, one with an ionic liquid layer of [MTBD][beti], and one without an ionic liquid layer, according to some embodiments of the present disclosure. The lower values of NECA at lower RH are due to insufficient ionomer wetting leading to inaccessible Pt within the inner pores of the HSC. The increased NECA for the sample having an ionic liquid layer indicates that incorporation of the ionic liquid into the inner carbon pores provides a protonic bridge that yields high protonic conductivity and increases the electrochemically accessible area. FIG. 5 illustrates a schematic showing how an ionic liquid may act as a protonic bridge to aid protonic transport from an ionomer to a catalyst (e.g., Pt) positioned within the pores of a solid (e.g., carbon) at dry conditions, according to some embodiments of the present disclosure.

Figure 6:
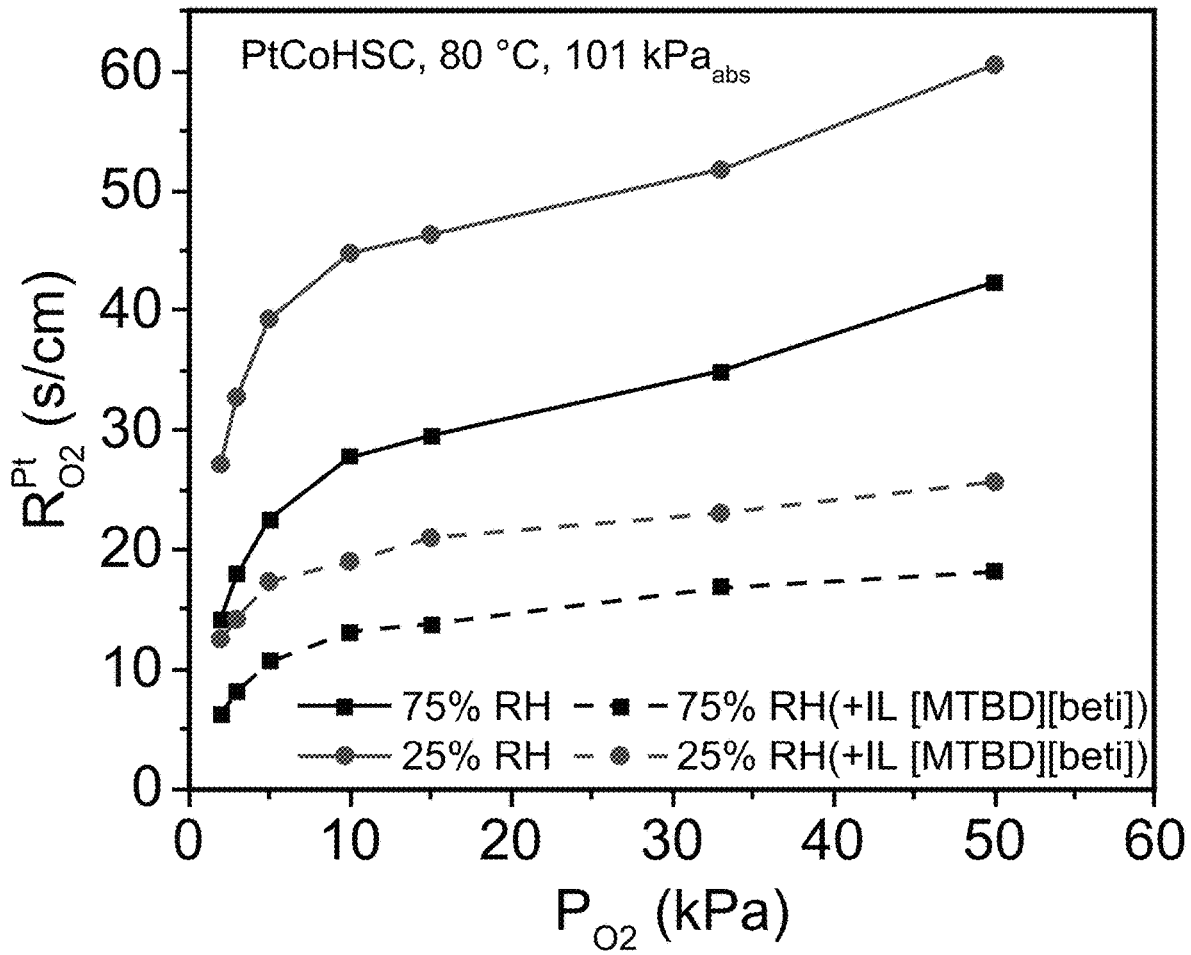
FIG. 6 illustrates a comparison of local oxygen transport resistances of two compositions, one with an ionic liquid layer and one without an ionic liquid layer, as a function of the partial pressure of oxygen, according to some embodiments of the present disclosure.
Figure 7:
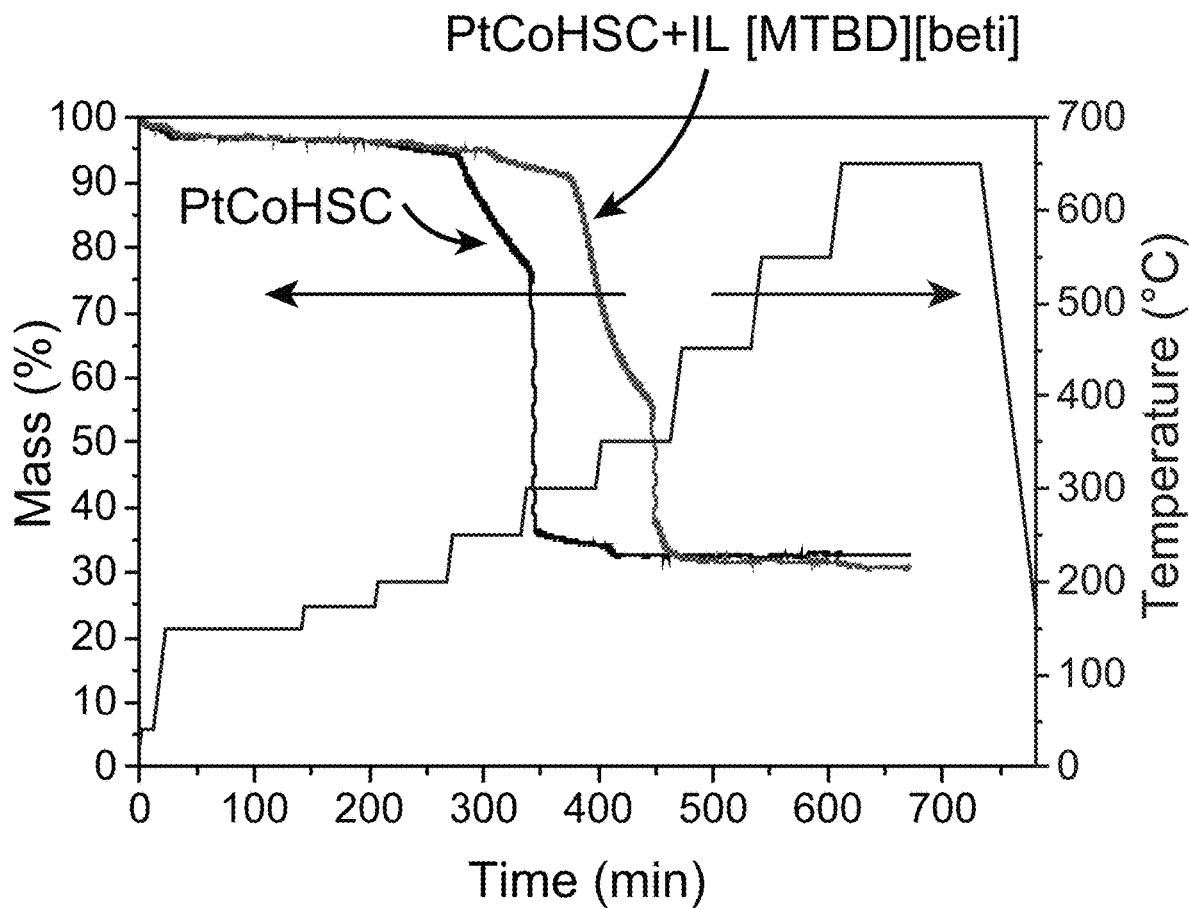
FIG. 7 illustrates a comparison of thermogravimetric analysis (TGA) data of two compositions, one with an ionic liquid layer and one without an ionic liquid layer, according to some embodiments of the present disclosure.

FIG. 6 illustrates local oxygen transport resistances of PtCoHSC MEA, with and without an ionic liquid layer of [MTBD][beti], as function of the partial pressure of oxygen at 80° C., according to some embodiments of the present disclosure. The high O2 solubility of the ionic liquid [MTBD][beti] aided transport of the O2 reactant within the mesopores of the solid, thereby decreasing the transport resistance and improving the performance of the composition. FIG. 7 illustrates thermogravimetric analysis (TGA) curves of PtCoHSC and PtCoHSC+IL showing mass change (left y axis) and corresponding temperature (right y axis) as function of time. The shape of the curve for the ionic liquid-containing material indicates that the loading of the ionic liquid on the solid was about 5.58 wt. %. Table 1 below provides more details on the TGA data.

prepared by dissolving the neutralized precursor in water. 300 mg of 30 wt % PtCo/HSC (Umicore, Pt30 0690) was added in 50 mL 0.025 M H[MTBD] solution followed by 60 minutes of ice-bath sonication. The catalysts were then collected by vacuum filtration and transferred into 50 mL of 0.025 M Li[beti] (Lithium bis(perfluoroethylsulfonyl)imide, iolitec, 99%) solution followed by another 60 minutes of ice-bath sonication. Finally, the IL coated catalysts were collected and following washed using vacuum filtration. All solutions were made with 18.2 MΩ cm² DI water (Millipore). The loading of IL on catalysts was determined by thermogravimetric analysis (TGA) (TA Instruments Q500).

Electrode Fabrication and Assembly: All catalyst coated membranes (CCM) were prepared according to the established protocol. Specifically, bare or IL coated 30 wt % PtCo/HSC (Umicore, Pt30 0690) was dispersed into a mixture of ionomer (Nafion Dupont D2020), deionized water (DI) and n-propanol (n-PA) with the desired ionomer to carbon (I/C) mass ratio of 0.5. The catalyst suspensions were then dispersed with 20 seconds of horn sonication followed by 20 minutes of ice-bath sonication. The catalyst layer was ultrasonically sprayed onto Nafion NR211 membranes (Ion-Power) using a Sono-Tek spray station with 25 kHz Accumist nozzle at target catalyst loadings for cathodes. Pt loadings on each individual electrode were verified by X-ray Fluorescence Spectroscopy (XRF) (Fisher XDV-SDD). Anode electrodes were prepared with Pt/HSC (TKK) dispersed in DI:n-PA (70 wt % water) with a I/C of 0.9 and a 0.05 $mg_{Pt}/cm^2$ loading.

Once fabricated, the CCMs were assembled into either 50 cm² hardware for performance metrics measurements such as $H_2/O_2$ polarization data, $H_2$/Air polarization data, kinetic activities, and ECA, or 5 cm² differential cells for $O_2$ limiting current experiments. The CCMs were positioned between either two 50 cm² SGL 29 BC gas diffusion layers (GDLs) at 25% compression or 5 cm² Freudenberg GDLs at 18% compression. The CCMs, GDLs, and polytetrafluoroethylene (PTFE) gaskets were then placed between the flow fields and the bolts tightened to 40 inch-pounds.

Thermogravimetric Analysis (TGA): The TGA measurements were carried out in an alumina crucible (Analytical West INC) with 5 mg mass sample for electrocatalysts using the simultaneous Thermal Analysis Modulus, SDT Q500 (TA Instruments) controlled by Advantage for Q Series software. Firstly, these measurements were performed under Ar atmosphere (flow of 10 mL/min) from 25 to 175° C. at

TABLE 1

TGA Data

| Mass loss | Water (150 C.) | Carbon + volatile + water (650 C.) | Metal | Carbon + volatile, dry fraction | metal, dry fraction | carbon fraction | IL fraction on catalyst |
|---|---|---|---|---|---|---|---|
| PtCoHSC | 0.034 | 0.673 | 0.327 | 0.662 | 0.338 | 0.662 | 0 |
| PtCoHSC + IL | 0.034 | 0.691 | 0.309 | 0.681 | 0.319 | 0.625 | 0.0558 |

Experimental Methods:

Sequential Deposition of Ionic Liquid (IL): Firstly, the precursor [MTBD] (7-methyl-1,5,7-triazabicyclo[4.4.0]dec-5-ene, Sigma Aldrich, 98%) and 10 M $HNO_3$ (VWR, ACS, 70%) were cooled in ice to near 0° C. $HNO_3$ solution was added drop wise to the [MTBD] until a near neutral pH was reached. After neutralization, 0.1 M H[MTBD] solution was 10° C./min and stay isothermal for 60 min to remove the water. After dehumidification, the samples were heated to 650° C. at 10° C./min under air atmosphere (flow of 10 mL/min) and temperature was holding for 60 min individually at 175, 200, 250, 300, 350, 450, 550 and 650° C. Finally, the samples were cooled down to room temperature under Ar atmosphere (flow of 10 mL/min).

Composition Examples

Example 1. A composition comprising: a solid; and a first ionic additive positioned on the solid, wherein: the first ionic additive is capable of forming an ionic liquid.

Example 2. The composition of Example 1, further comprising: a second ionic additive positioned on the solid, wherein: the first ionic additive and the second ionic additive form the ionic liquid, and the ionic liquid forms a first layer on the solid.

Example 3. The composition of either Example 1 or Example 2, further comprising: a second layer comprising an ionomer, wherein: the first layer is positioned between the second layer and the solid, and the ionomer is ionically conductive.

Example 4. The composition of any one of Examples 1-3, further comprising: a catalyst positioned on the solid, wherein: the catalyst is positioned between the solid and the first layer.

Example 5. The composition of any one of Examples 1-4, wherein the catalyst comprises a metal.

Example 6. The composition of any one of Examples 1-5, wherein the metal comprises at least one of a transition metal or a post-transition metal.

Example 7. The composition of any one of Examples 1-6, wherein the transition metal comprises at least one of platinum, palladium, gold, silver, nickel, cobalt, or copper iridium.

Example 8. The composition of any one of Examples 1-7, wherein the post-transition metal comprises at least one of bismuth, lead, or tin.

Example 9. The composition of any one of Examples 1-8, wherein the solid comprises a porous material.

Example 10. The composition of any one of Examples 1-9, wherein the catalyst is positioned within a pore of the solid.

Example 11. The composition of any one of Examples 1-10, wherein the porous material comprises at least one of carbon or a metal oxide.

Example 12. the composition of any one of Examples 1-11, wherein the metal oxide comprises at least one of alumina, silica, or titania.

Example 13. The composition of any one of Examples 1-12, wherein the carbon comprises at least one of a Ketjen carbon or a furnace black.

Example 14. The composition of any one of Examples 1-13, wherein the furnace black comprises an oxidized acetylene black.

Example 15. The composition of any one of Examples 1-14, wherein the solid has an average particle size between about 10 nm and about 1 mm.

Example 16. The composition of any one of Examples 1-15, wherein the first ionic additive comprises an anion comprising at least one of bis(perfluoroethylsulfonyl)imide (beti), (bis(trifluoromethylsulfonyl)imide) (Tf2N), tetrafluoroborate (BF4), or hexafluorophosphate (PF6).

Example 17. The composition of any one of Examples 1-16, wherein the second ionic additive comprises a cation comprising at least one of an imidazolium-based cation, a pyridinium-based cation, a guanidinium-based cation, or a pyrazolium-based cation.

Example 18. The composition of any one of Examples 1-17, wherein the imidazolium-based cation comprises at least one of 7-methyl-1,5,7-triazabicyclo[4.4.0]dec-5-ene (MTBD), 1-butyl-3-methyl-imidazolium (BMIM), or 1-ethyl-3-methylimidazolium (EMIM).

Example 19. The composition of any one of Examples 1-18, further comprising at least one physical property or performance metric favorable for the oxygen reduction reaction.

Example 20. The composition of any one of Examples 1-19, wherein the at least one physical property or performance metric comprises at least one proton conductivity, oxygen solubility, viscosity, hydrophobicity, $CO_2$ solubility, CO solubility, or thermal stability.

Method Examples

Example 1. A method comprising: a first mixing of a solid with a first solution comprising a first solvent and a first salt of a first ionic additive, resulting in a forming of a first slurry comprising the solid and a depositing of a first ion onto the solid; and a second mixing of the solid with a second solution comprising a second solvent and a second salt of a second ionic additive, resulting in a forming of a second slurry comprising the solid, a depositing of a second ion onto the solid, and a forming of an ionic liquid on the solid, wherein: the first ion has a charge opposite the charge of the second ion, and the ionic liquid comprises the first ion and the second ion.

Example 2. The method of Example 1, wherein the first mixing is performed utilizing at least one of ultrasound or mechanical mixing.

Example 3. The method of either Example 1 or Example 2, wherein the first mixing is performed at a first temperature between about 0° C. and about 80° C. or between about 0° C. and about 30° C.

Example 4. The method of any one of Examples 1-3, wherein the first salt is present in the first solution at a first concentration between about 0.001 mmol/L and the saturation point of the first salt in the first solution or between about 0.001 mol/L and about 1 mol/L.

Example 5. The method of any one of Examples 1-4, wherein: the first salt comprises at least one of Li[beti], Li[Tf2N], Na[BF4], Na[PF6], H[MTBD], [BMIM]Cl, or [EMIM]Cl, and the first salt provides the first ion.

Example 6. The method of any one of Examples 1-5, wherein the second mixing is performed utilizing at least one of ultrasound or mechanical mixing.

Example 7. The method of any one of Examples 1-6, wherein the second mixing is performed at a second temperature between about 0° C. and about 80° C. or between about 0° C. and about 30° C.

Example 8. The method of any one of Examples 1-7, wherein the second salt is present in the second solution at a second concentration between about 0.001 mmol/L and the saturation point of the second salt in the second solution or between about 0.001 mol/L and about 1 mol/L.

Example 9. The method of any one of Examples 1-8, wherein: the second salt comprises at least one of Li[beti], Li[Tf2N], Na[BF4], Na[PF6], H[MTBD], [BMIM]Cl, or [EMIM]Cl, and the second salt provides the second ion.

Example 10. The method of any one of Examples 1-9, wherein the first solvent comprises at least one of water, isopropyl alcohol, n-propanol alcohol (NPA), dimethylformamide, hexane, or acetonitrile.

Example 11. The method of any one of Examples 1-10, further comprising, after the first mixing, a first separating of the solid from the first slurry, resulting in the solid being substantially free of the first solvent.

Example 12. The method of any one of Examples 1-11, wherein the first separating is performed by at least one of filtration, centrifugation, or evaporation.

Example 13. The method of any one of Examples 1-12, wherein the second solvent comprises at least one of water, isopropyl alcohol, NPA, dimethylformamide, hexane, or acetonitrile.

Example 14. The method of any one of Examples 1-13, further comprising, after the second mixing, a second separating of the solid from the second slurry, resulting in the solid being substantially free of the second solvent.

Example 15. The method of any one of Examples 1-14, wherein the second separating is performed by at least one of filtration, centrifugation, or evaporation.

Example 16. The method of any one of Examples 1-15, further comprising, after the second separating: contacting the solid with a liquid, wherein: the contacting removes an impurity from the solid.

Example 17. The method of any one of Examples 1-16, further comprising, after the second separating, drying the solid.

Example 18. The method of any one of Examples 1-17, wherein the drying is performed at a pressure less than atmospheric pressure.

Example 19. The method of any one of Examples 1-18, wherein the drying is performed at a temperature greater than 25° C.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
   a solid comprising at least one of carbon or a metal oxide;
   a first layer comprising an ionic liquid comprising an anion and a cation;
   a second layer comprising an ionically conductive ionomer; and
   a catalyst comprising at least one of bismuth, lead, or tin positioned on the solid;
   wherein:
   the anion comprises at least one of bis(trifluoromethylsulfonyl)imide, tetrafluoroborate, or hexafluorophosphate,
   the cation comprises at least one of an imidazolium-based cation, a pyridinium-based cation, a guanidinium-based cation, or a pyrazolium-based cation,
   the ionic liquid forms a first layer on the solid,
   the first layer is positioned between the second layer and the solid, and
   the catalyst is positioned between the solid and the first layer.

2. The composition of claim 1, wherein the solid comprises a porous material.

3. The composition of claim 2, wherein the catalyst is positioned within a pore of the porous material.

4. The composition of claim 1, wherein the solid has an average particle size between about 10 nm and about 1 mm.

5. The composition of claim 1, wherein the imidazolium-based cation comprises at least one of 7-methyl-1,5,7-triazabicyclo[4.4.0]dec-5-ene, 1-butyl-3-methyl-imidazolium, or 1-ethyl-3-methylimidazolium.

6. The composition of claim 1, wherein the metal oxide comprises at least one of alumina, silica, or titania.

7. The composition of claim 1, wherein the carbon comprises a furnace black.

8. The composition of claim 7, wherein the furnace black comprises an oxidized acetylene black.

9. The composition of claim 1, wherein the solid has an average particle size between about 10 nm and about 1 mm.

* * * * *